(12) United States Patent
Bailey et al.

(10) Patent No.: US 8,083,283 B2
(45) Date of Patent: Dec. 27, 2011

(54) ARMREST FOAM BUN INSERT

(75) Inventors: Charles D. Bailey, Shelby Township, MI (US); Jay Murdock, Madison Heights, MI (US); Richard Blue, Clarkston, MI (US)

(73) Assignee: International Automobile Components Group North America, Inc., Dearborn, MI (US)

( * ) Notice: Subject to any disclaimer, the term of this patent is extended or adjusted under 35 U.S.C. 154(b) by 0 days.

(21) Appl. No.: 12/776,190

(22) Filed: May 7, 2010

(65) Prior Publication Data

US 2011/0272962 A1 Nov. 10, 2011

(51) Int. Cl.
*B60J 9/00* (2006.01)
*A47C 7/54* (2006.01)

(52) U.S. Cl. ............... 296/153; 296/1.09; 297/411.2

(58) Field of Classification Search .......... 296/153, 296/1.09; 297/411.2, 411.21, 411.26
See application file for complete search history.

(56) References Cited

U.S. PATENT DOCUMENTS

| | | | |
|---|---|---|---|
| 3,123,403 A * | 3/1964 | Hood | 297/411.21 |
| 4,019,779 A | 4/1977 | Hogan | |
| 6,070,271 A | 6/2000 | Williams | |
| 6,213,538 B1 | 4/2001 | Scheidmantel et al. | |
| 6,248,205 B1 | 6/2001 | Scheidmantel et al. | |
| 6,391,232 B1 | 5/2002 | Fritsch | |
| 6,986,543 B2 | 1/2006 | Reed | |
| 7,055,888 B2 | 6/2006 | Reed et al. | |
| 7,226,113 B2 * | 6/2007 | Dreier et al. | 296/153 |

FOREIGN PATENT DOCUMENTS

JP 63178009 7/1988

OTHER PUBLICATIONS

GM Engineering Standards, "Material Specification General GM6084M, Molded Polyurethane Foam for Trim Items" Feb. 2003 (2 pages).
ASTM International, "Standard Test Methods for Flexible Cellular Materials—Slab, Bonded, and Molded Urethane Foams," Designation: D 3574-08 (27 pages), (Dated Apr. 13, 2010).

* cited by examiner

*Primary Examiner* — Dennis Pedder
(74) *Attorney, Agent, or Firm* — Grossman, Tucker, Perreault & Pfleger, PLLC

(57) ABSTRACT

An armrest is provided including a flexible skin overlying at least a portion of a substrate member, the skin coupled to substrate member, the flexible skin and the substrate member defining a cavity there between and an opening along one edge, and a foam bun insertable in the cavity to form the armrest, wherein the foam bun comprises a first foam portion which the flexible skin overlies and a second foam carrier portion which closes off the opening. The first foam portion has a hardness that is less than the hardness of said second foam carrier portion, the foam bun further including an integrally formed locking flange to engage with an edge of the substrate and an integrally formed skin lock to engage with an edge of the skin.

28 Claims, 4 Drawing Sheets

FIG. 6

100
INJECT OR POUR URETHANE FOAM PRECURSORS INTO A MOLD COMPRISING A FIRST MOLD COVER AND FIRST MOLD CAVITY TO FORM A MOLDED FOAM PORTION 56

200
REPLACE THE FIRST MOLD COVER WITH A SECOND MOLD COVER INCLUDING A SECOND CAVITY THAT MAY BE PLACED ADJACENT AN EDGE OF THE MOLDED FOAM PORTION 56 IN THE FIRST CAVITY

300
INJECT OR POUR URETHANE FOAM PRECURSORS FOR A RELATIVELY HARDER FOAM INTO THE MOLD FORMED BY THE FIRST CAVITY AND THE SECOND COVER TO FORM A CARRIER PORTION 50 ADHERED TO THE FIRST FOAM PORTION 56

400
REMOVE FOAM BUN 22 HAVING A RELATIVELY SOFTER FOAM PORTION 56 AND A RELATIVELY HARDER PORTION 50

ARMREST FOAM BUN INSERT

FIELD

The present disclosure relates to armrests of the type that have a foam bun inserted therein for cushioning an arm-supporting surface, and more specifically, an insertable armrest bun comprising one or more foam portions of different hardness.

BACKGROUND

U.S. Pat. No. 6,213,538 relates to an armrest and method for manufacturing the same. The '538 patent discloses an armrest bun comprising a die-cut foam pad adhered to a plastic substrate. The substrate and foam are inserted within the armrest skin to provide cushioning for the occupants of a vehicle.

Armrests are manufactured in many and various sizes and shapes for all sorts of transportation vehicles as well as for furniture. In the past, armrests were generally rectangular in shape to simplify manufacturing. The trend in newer vehicles now includes complex curvatures and tapered surfaces. This new more curved shaping may be more aesthetically appealing and may provide better comfort by conforming more closely to the shape of the portion of the arm that may be cushioned.

The foam comprising the armrest bun may closely match the outer shape of the armrest and fully support the outer skin so that wrinkles and depressions are not seen.

A problem relates to the shaping of the die-cut foam, such as disclosed by the '538 patent, to properly fit the more curved armrests of today. Providing a die-cut foam bun having the desired shaping, which may include complex curvatures and tapered surfaces, may require a number of cutting operations. Multiple workstations may be required to focus on the cutting of the different and varied surfaces. For instance, one station may be needed to cut a blank, another station may be needed to cut a curve on the blank, and yet another station may be needed to cut a taper on the blank, all in a less than desirable cost effective manner.

Armrests were manufactured as a separate component for many years, and comprised a formed metal or plastic substrate, a separately molded outer skin and urethane foam precursors poured between the skin and substrate which expanded and cured to form a semi-rigid cushioning foam. This component was then mechanically attached to, for instance, the inner door panel of a vehicle.

More recently, a more efficient manufacturing process has been developed wherein the outer skin and substrate may both be injection molded by "insert-molding" or "over-molding" such that a pocket or cavity is created, into which a foam bun may be inserted to form the armrest.

U.S. Pat. No. 7,055,888, commonly owned by the assignee of the present disclosure is directed at a skin coupled to a first substrate that forms a cavity for inserting a foam bun into, the bun comprising a second substrate and a foam layer bonded to the second substrate. The first and second substrates are connectable to position the armrest on a door panel.

The present disclosure provides a less complex, more cost effective assembly by eliminating the second substrate or replacing the second substrate with a second relatively harder foam that may be formed coincident with the relatively softer foam bun. Accordingly, a more cost-effective method for manufacturing insertable armrest buns is provided.

SUMMARY

An armrest comprising a flexible skin having a plurality of edges and overlying at least a portion of a substrate member having a plurality of edges, the skin coupled to the substrate member along at least one common edge, the flexible skin and the substrate member defining a cavity there between having an opening along an edge. A foam bun is contained within the cavity, the foam bun insertable in the cavity to form the armrest and close said opening wherein the foam bun comprises a first cushioning foam portion which the flexible skin overlies and a second carrier foam portion which closes off the opening. The first cushioning foam portion has a hardness that is less than the hardness of the second carrier foam portion and the foam bun further including an integrally formed locking flange to engage with an edge of the substrate and an integrally formed skin lock to engage with an edge of the skin.

An armrest comprising a flexible skin having a plurality of edges and overlying at least a portion of a substrate member having a plurality of edges, the skin coupled to said substrate member along at least one common edge, the flexible skin and the substrate member defining a cavity there between having an opening along an edge and a foam bun contained within the cavity, the foam bun insertable in the cavity to form the armrest and close said opening. The foam bun comprises a cushioning foam portion which the flexible skin overlies and which closes off the opening, the foam bun further including an integrally formed locking flange to engage with an edge of said substrate and an integrally formed skin lock to engage with an edge of the skin.

An automotive door trim assembly comprising an interior trim door panel and an armrest attached to the door panel, the armrest comprising a flexible skin having a plurality of edges and overlying at least a portion of a substrate member having a plurality of edges, the skin coupled to the substrate member along at least one common edge, the flexible skin and the substrate member defining a cavity there between having an opening along an edge. A foam bun is contained within the cavity, the foam bun insertable in the cavity to form the armrest and close the opening; the foam bun formed by over-molding wherein the foam bun comprises a first cushioning foam portion which said flexible skin overlies and a second carrier foam portion which closes off the opening.

The first cushioning foam portion has a hardness that is less than the hardness of the second carrier foam portion and the foam bun further includes an integrally formed locking flange to engage with an edge of the substrate and an integrally formed skin lock to engage with an edge of the skin.

A method for forming an armrest, comprising providing a flexible skin having a plurality of edges, providing a substrate member having a plurality of edges, coupling the skin to the substrate along at least one common edge, such that the skin overlies at least a portion of the substrate member, the flexible skin and the substrate member defining a cavity there between having an opening along an edge. This is followed by providing a foam bun to be contained within the cavity, the foam bun insertable in the cavity to form the armrest and close the opening; wherein the foam bun is formed by over-molding a second carrier foam portion over a first cushioning foam portion and inserting the foam bun into the cavity. The flexible skin overlies the first cushioning foam portion and the second carrier foam portion closes off the opening. This is followed by engaging an integrally formed locking flange on the bun to an edge of the substrate and engaging an integrally formed skin lock on the bun with an edge of the skin wherein the first foam portion has a hardness that is less than the hardness of the second foam carrier portion.

BRIEF DESCRIPTION OF THE DRAWINGS

The features, operation and advantages of the invention may be better understood from the following detailed descrip

FIG. 6 is a process diagram for the molding of one embodiment of the present disclosure.

DETAILED DESCRIPTION

Various features of the present invention will now become readily apparent to those skilled in the art from the following detailed description, wherein the invention is shown along with certain preferred embodiments. As will be realized the invention is capable of other and different embodiments, and its several details are capable of modification in various respects. Accordingly, the description is to be regarded as illustrative in nature and not as restrictive.

Figure 1:
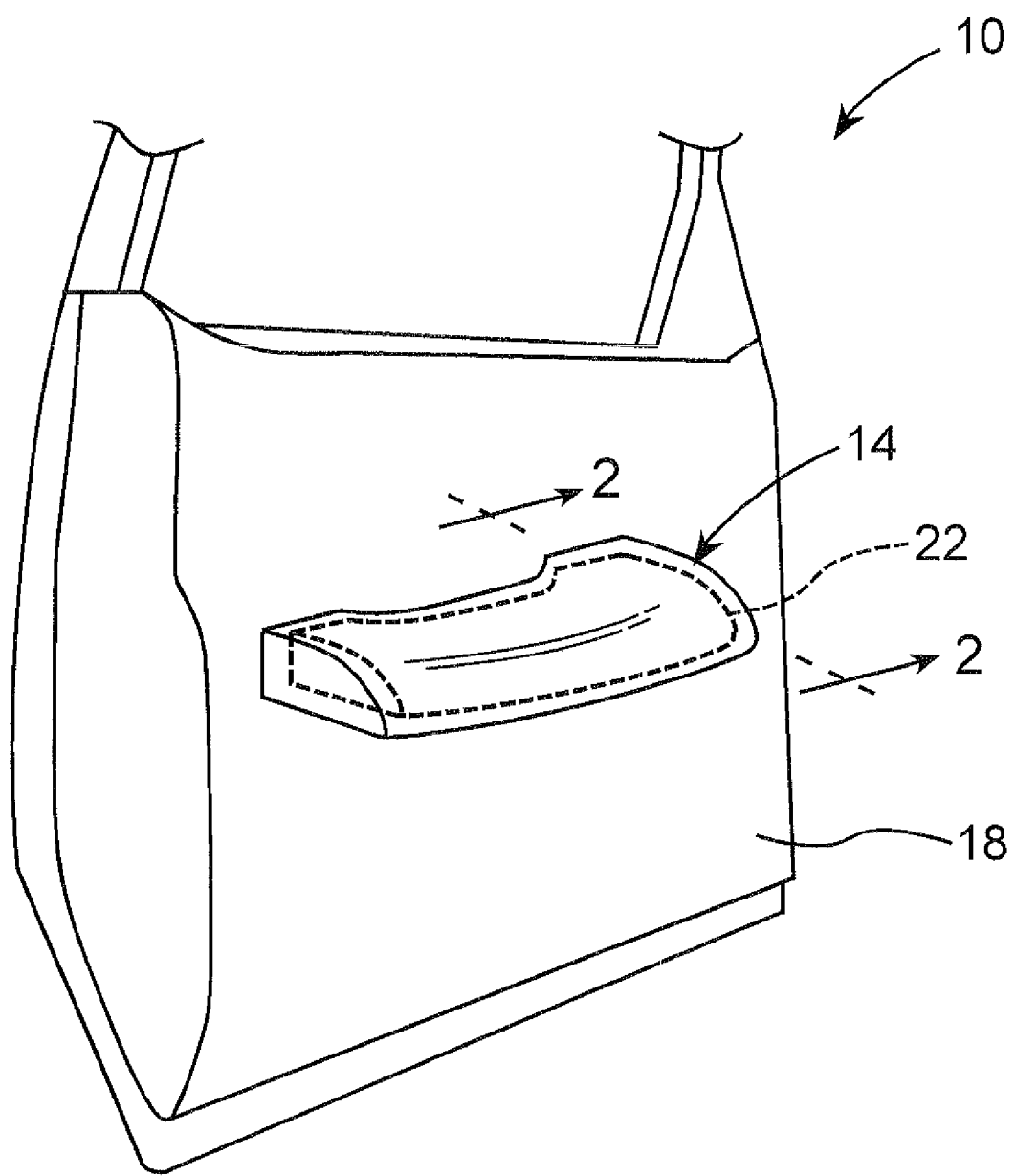
- FIG. 1 illustrates a door assembly in accordance with the present disclosure.

FIG. 1 illustrates a vehicle door assembly 10 in accordance with the present disclosure. The door assembly 10 includes an armrest 14 such as commonly used in automotive vehicles. The present invention is not limited to the embodiment shown in FIG. 1. The present invention contemplates a number of embodiments, including non-automotive applications, such as boats, trains, planes, furniture and the like.

The armrest 14 attaches to a door panel 18 of the vehicle by a fastener or other means to provide a resting location for the arm of an occupant in such vehicle. The armrest 14 may include an arcuate or curved upper surface and a tapered shape to provide an aesthetically appealing, comfortable and safe armrest. The curvature and taper define an outward appearance shape for the armrest 14. Other shapes and configurations may also be used without deviating from the scope and contemplation of the present invention.

Figure 2:
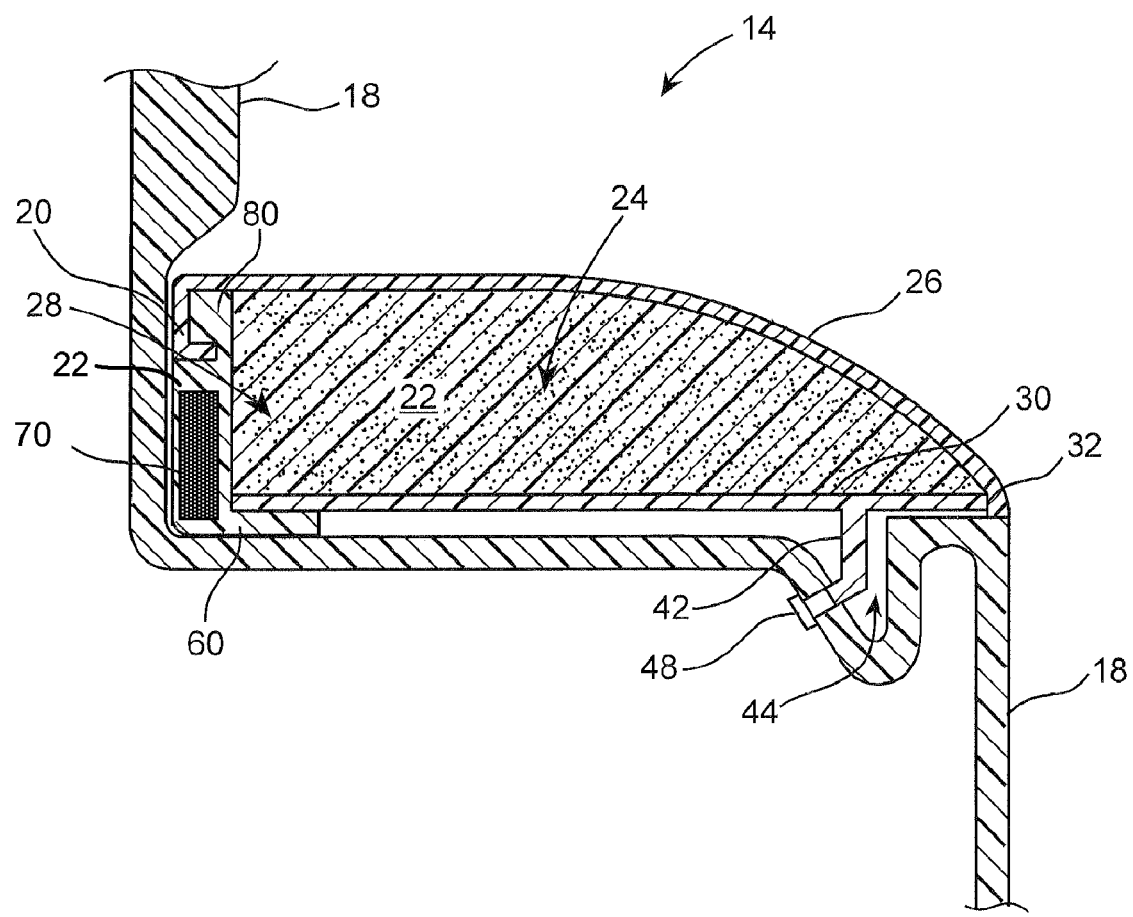
FIG. 2 illustrates a cross-sectional view of an armrest shown in FIG. 1 along the line 2-2.

The armrest 14 may include an armrest bun 22 which may be inserted within a cavity 24 of the armrest 14 formed by the coupling of a skin layer 26 and a substrate 30 to provide cushioning thereto, as shown in FIG. 2. The armrest bun 22 may be inserted at a rearward end 28 of the cavity 24 which ultimately lies adjacent the door panel 18. The present disclosure contemplates alternative designs that may include one or more buns that may be inserted at different areas on the armrest 14.

FIG. 2 illustrates a cross-sectional view of the armrest 14 shown in FIG. 1 taken along line 2-2. The armrest 14 includes an outer skin 26 that covers the top surface of the inserted bun and is attached to a substrate 30. The outer skin 26 may be molded to or separately attached to the substrate 30. The substrate 30 and skin 26 may both be injection molded by "insert-molding" or "over-molding" such that one or more of the common edges (for instance 32 in FIG. 2) of the skin and substrate are joined together during the melt processing of one of the materials forming the skin or substrate. In this manner, a pocket or cavity 24 is created, into which a foam bun 22 may be inserted.

The outer skin 26 may comprise a flexible material to facilitate its comfort and appearance, including, but not limited to, polyvinyl chloride (PVC), PVC/ABS (acrylonitrile-butadiene-styrene) blends, PVC/cross-linked olefin-based thermoplastic elastomer alloys, thermoplastic urethane (TPU), thermoset urethane, themoplastic polyolefin (TPO), thermoplastic elastomer (TPE), styrene block copolymers, and combinations there of.

The substrate 30 may comprise a plastic, as such ABS, PC (polycarbonate)/ABS, polypropylene (PP), wood fiber composites, such as woodstock or lignatock, metal, or other similar relatively rigid materials.

The outer skin 26 may also be mechanically or adhesively joined to the substrate 30 along one or more common edges. The substrate 30 may include an angled flange 42 to secure the armrest 14 to the door panel 18, generally in a shelf area of the door panel. The angled flange 42 may be inserted through an opening 44 in the door panel during assembly. The angled flange 42 may be pulled by a fastener 48 to connect the substrate 30 during installation of the armrest 14 to force the armrest 14 against the door panel 18, thereby minimizing gap formation between the outer skin 26 and the door panel 18.

Figure 3:
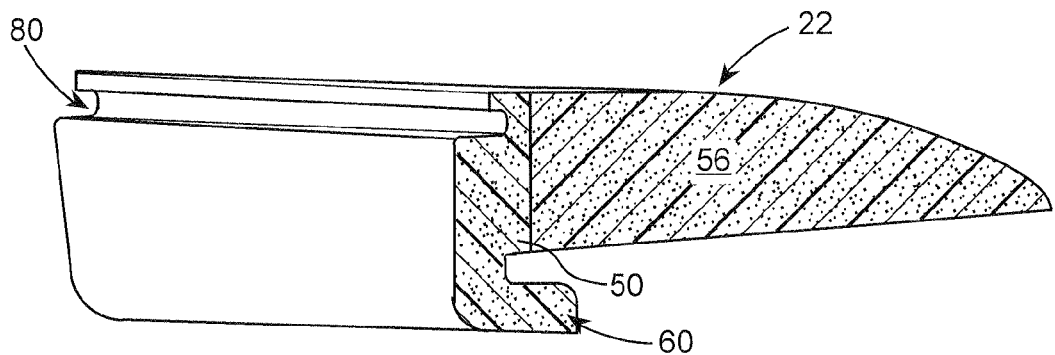
FIG. 3 illustrates a cross-sectional view of the armrest bun of FIG. 1 in accordance with a first embodiment the present disclosure.

The armrest bun 22 in a first exemplary embodiment may include a carrier portion 50 and a cushioning portion 56 as shown in FIG. 3. The carrier portion 50 may be integrally molded to the cushioning portion 56 during the molding process and then inserted within the armrest cavity 24 defined by the substrate 30 and the outer skin 26. The cushioning portion 56 may be shaped to match the desired outer contour of the armrest 14 so that it snugly fits within the armrest cavity and against the skin 26 and provides relatively even support throughout so that most, if not all, of the skin 26 is supported by the foam bun 22.

FIG. 3 illustrates a cross-sectional view of the armrest bun of FIG. 1 in accordance with a first embodiment of the present disclosure. The bun 22 comprises two portions, a carrier portion 50 for handling and positioning and a relatively softer cushioning portion 56 for supporting the skin 26 and for cushioning the arm of an occupant of the vehicle. The carrier portion 50 further includes a locking flange 60 which may engage with an end of the substrate 30 as shown in FIG. 2 to lock the bun 22 into position on the door panel 18. The carrier portion 50 also includes a skin lock 80 for locking the skin edge 20 of the cavity 24 to close out the armrest and secure the skin edge 20 in a substantially net condition against the surface of the door panel 18.

In this embodiment, the armrest bun 22 may comprise a molded foam having portions of two different hardnesses and may be formed of any foamable polymer, for instance polyurethane, polyolefin, silicone, etc.

FIG. 6 provides a sequence of process steps. Preferably, the bun is formed by pouring or injecting liquid urethane precursors for a relatively softer cushioning foam into a closed mold cavity, allowing the precursors to expand and cure to form a first molded cushioning portion 56 (BLOCK 100), and then replacing the mold cover with a second cover having a second cavity therein that is placed adjacent the first molded cushioning portion 56 (BLOCK 200). A second set of liquid urethane precursors for a second relatively harder foam are then poured or injected into the second cavity (BLOCK 300) and against the first molded cushioning portion 56 and allowed to expand and cure to form the carrier portion 50, adhered to the cushioning portion 56 (BLOCK 400). In this embodiment, the skin lock 80 and locking flange 60 are formed of the second, relatively harder foam 50.

The first molded cushioning foam portion 56 may specifically have a hardness of 8.5+/−3 lbs. as an Indentation Load Deflection value measured according to General Motors Test Procedure 6084M, using a 38 mm diameter hemisphere indenter pressed into the bun at 38.1 mm/minute to a depth of two-thirds of the bun thickness with a 5 second dwell. The carrier portion 56 may have a hardness of 20+/−3 lbs. as an Indentation Load Deflection value measured according to General Motors Test Procedure 6084M, using a 38 mm diameter hemisphere indenter pressed into the bun at 38.1 mm/minute to a depth of two-thirds of the bun thickness with a 5 second dwell. In this embodiment, the carrier foam portion 50 is over-molded against the cushioning portion 50 and forms the end of the foam bun 22 that closes out the opening 28 in the cavity 24 formed by the skin and substrate.

Figure 4:
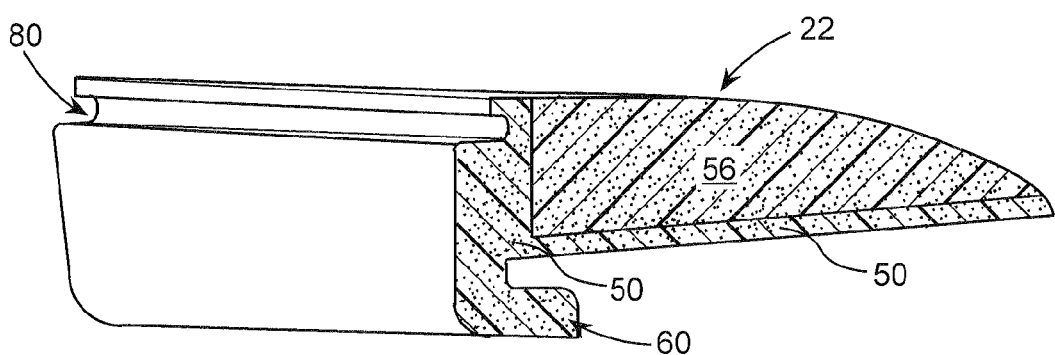
FIG. 4 illustrates a cross-sectional view of the armrest bun of FIG. 1 in accordance with a second embodiment of the present invention.

In a second exemplary embodiment, as shown in FIG. 4, the relatively harder carrier foam portion 50 may be molded to extend under the relatively softer cushioning foam portion 56 for some or all of its length and width, that is, along two or more of the sides or ends of the softer foam portion 56. The configuration shown in FIG. 4 may ease the difficulty in inserting the foam bun 22 into the cavity 24 formed by the skin 26 and substrate 30, as the harder carrier foam 50 that extends along the bottom of the bun 22 may provide a somewhat stiffer bun that may not be as prone to wrinkling of the cushioning foam 56 during insertion.

Figure 5:
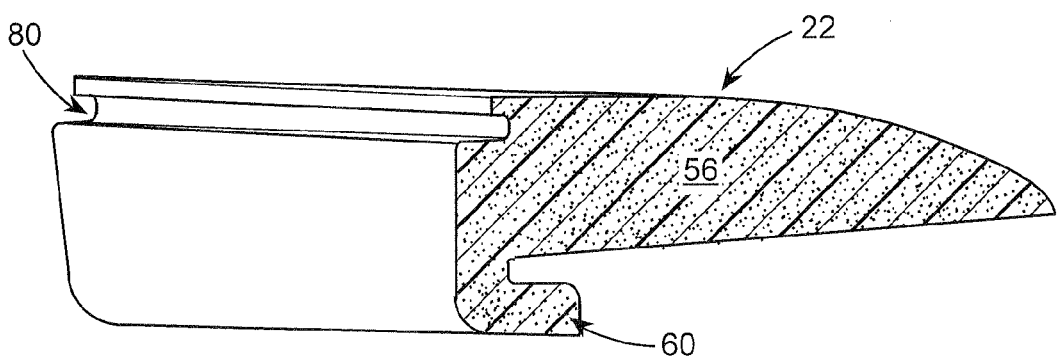
FIG. 5 illustrates a cross-sectional view of the armrest bun of FIG. 1 in accordance with a third embodiment of the present invention.

In a third exemplary embodiment, as shown in FIG. 5, the relatively harder carrier foam portion 50 may be eliminated and the entire foam bun 22 molded of the relatively softer cushioning foam 56 (BLOCK 100 in FIG. 6).

It is contemplated that for any of the three embodiments that a relatively porous reinforcing material 70, as shown in FIG. 2, such as cloth, webbing, shelf liner, etc. may be molded in place, that is integrally formed, in the area of the skin lock and locking flange to provide additional strength.

The integrally formed locking flange 60 may include a groove into which the substrate 30 may fit proximate the opening 28 of the armrest cavity 24 to position the bun 22 thereto. The flange may further include detents or other features to provide a friction fit. The substrate may include an aperture to receive such detent and secure the bun 22 to the substrate 30.

The carrier portion 50, or 56 in the case of the third embodiment, may include an integrally formed skin lock 80 in the form of an undercut for receiving a lip or edge 20 of the outer skin 26. The skin lock 80 may position the outer skin 26 adjacent the door panel 18. The skin lock 80 may also limit the edge of the outer skin 26 from flexing away from door panel 18. Preferably, the outer skin 26 is stretched slightly to fit over the skin lock 80 and pull the skin 26 into a relatively taut condition.

"Integrally formed" as used herein refers to the formation of a feature (e.g. groove, reinforcement, etc.) in a molded part that is formed coincident with the formation of the molded part and not added subsequent to the forming of the molded part.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An armrest comprising:
   a flexible skin having a plurality of edges and overlying at least a portion of a substrate member having a plurality of edges, said skin coupled to said substrate member along at least one common edge, said flexible skin and said substrate member defining a cavity there between having an opening along an edge;
   a foam bun contained within said cavity, said foam bun insertable in said cavity to form said armrest and close said opening;
   wherein said foam bun comprises a first cushioning foam portion which said flexible skin overlies and a second carrier foam portion which closes off said opening,
   wherein said first cushioning foam portion has a hardness that is less than the hardness of said second carrier foam portion,
   said foam bun further including an integrally formed locking flange with a groove to engage with an edge of said substrate and provide a friction fit, and an integrally formed skin lock to engage with an edge of said skin, wherein said groove is defined by said first cushioning foam portion and said second carrier foam portion.

2. The armrest of claim 1 wherein said bun comprises urethane foam.

3. The armrest of claim 1 wherein said first cushioning foam portion has an ILD of 8.5+/−3.0 lbs.

4. The armrest of claim 1 wherein said second carrier foam portion has an ILD of 20.0+/−3.0 lbs.

5. The armrest of claim 1 wherein said substrate includes a flange that may be attached to a door panel of a vehicle.

6. The armrest of claim 1 wherein said skin and said substrate member are coupled during the melt processing of one of said skin and said substrate member against the other to form said cavity.

7. The armrest of claim 1 wherein said skin and said substrate member are adhesively or mechanically coupled to form said cavity.

8. The armrest of claim 1 wherein said carrier foam portion includes molded-in reinforcing materials.

9. The armrest of claim 1 wherein said carrier foam portion forms an end of said foam bun.

10. The armrest of claim 1 wherein said carrier foam portion forms a surface of said foam bun.

11. The armrest of claim 1 wherein said first cushioning foam portion and said carrier foam portion are over-molded from urethane precursor materials.

12. An armrest comprising:
    a flexible skin having a plurality of edges and overlying at least a portion of a substrate member having a plurality of edges, said skin coupled to said substrate member along at least one common edge, said flexible skin and said substrate member defining a cavity there between having an opening along an edge;
    a foam bun contained within said cavity, said foam bun insertable in said cavity to form said armrest and close said opening;
    wherein said foam bun comprises a first cushioning foam portion which said flexible skin overlies and a second carrier foam portion which closes off said opening,
    said foam bun further including an integrally formed locking flange with a groove to engage with an edge of said substrate and provide a friction fit, and an integrally formed skin lock to engage with an edge of said skin, wherein said groove is defined by said first cushioning foam portion and said second carrier foam portion.

13. The armrest of claim 12 wherein said bun comprises urethane foam.

14. The armrest of claim 12 wherein said cushioning foam portion has an ILD of 8.5+/−3.0 lbs.

15. The armrest of claim 12 wherein said substrate includes a flange that may be attached to a door panel of a vehicle.

16. The armrest of claim 12 wherein said skin and said substrate member are coupled during the melt processing of one of said skin and said substrate member against the other to form said cavity.

17. The armrest of claim 12 wherein said skin and said substrate member are adhesively or mechanically coupled to form said cavity.

18. The armrest of claim 12 wherein said first foam portion includes molded-in reinforcing materials.

19. An automotive door trim assembly comprising:
an interior trim door panel;
an armrest attached to said door panel, the armrest comprising:
a flexible skin having a plurality of edges and overlying at least a portion of a substrate member having a plurality of edges, said skin coupled to said substrate member along at least one common edge, said flexible skin and said substrate member defining a cavity there between having an opening along an edge;
a foam bun contained within said cavity, said foam bun insertable in said cavity to form said armrest and close said opening; said foam bun formed by over-molding a second carrier foam portion over a first cushioning foam portion;
wherein said flexible skin overlies said first cushioning foam portion and said second carrier foam portion closes off said opening,
wherein said first cushioning foam portion has a hardness that is less than the hardness of said second carrier foam portion,
said foam bun further including an integrally formed locking flange with a groove to engage with an edge of said substrate and provide a friction fit, and an integrally formed skin lock to engage with an edge of said skin, wherein said groove is defined by said first cushioning foam portion and said second carrier foam portion.

20. The armrest of claim 19 wherein said substrate includes a flange that may be attached to said door panel.

21. The armrest of claim 19 wherein said first cushioning foam portion has an ILD of 8.5+/−3.0 lbs.

22. The armrest of claim 19 wherein said second carrier foam portion has an ILD of 20.0+/−3.0 lbs.

23. A method for forming an armrest, comprising:
providing a flexible skin having a plurality of edges;
providing a substrate member having a plurality of edges,
coupling said skin to said substrate along at least one common edge, such that said skin overlies at least a portion of said substrate member, said flexible skin and said substrate member defining a cavity there between having an opening along an edge;
providing a foam bun to be contained within said cavity, said foam bun insertable in said cavity to form said armrest and close said opening; wherein said foam bun is formed by over-molding a second carrier foam portion over a first cushioning foam portion;
inserting said foam bun into said cavity;
wherein said flexible skin overlies said first cushioning foam portion and said second carrier foam portion closes off said opening,
engaging an integrally formed locking flange with a groove on said bun to an edge of said substrate and providing a friction fit, and engaging an integrally formed skin lock on said bun with an edge of said skin, wherein said groove is defined by said first cushioning foam portion and said second carrier foam portion,
wherein said first foam portion has a hardness that is less than the hardness of said second foam carrier portion.

24. The method of claim 23 wherein said bun comprises urethane foam.

25. The armrest of claim 23 wherein said first cushioning foam portion has an ILD of 8.5+−3.0 lbs. and said second carrier foam portion has an ILD of 20.0+/−3.0 lbs.

26. The armrest of claim 23 wherein said skin and said substrate member are coupled during the melt processing of one of said skin and said substrate member against the other to form said cavity.

27. The armrest of claim 23 wherein said carrier foam portion forms an end of said foam bun.

28. The armrest of claim 23 wherein said carrier foam portion forms a surface of said foam bun.

* * * * *

UNITED STATES PATENT AND TRADEMARK OFFICE
CERTIFICATE OF CORRECTION

| | | |
|---|---|---|
| PATENT NO. | : 8,083,283 B2 | |
| APPLICATION NO. | : 12/776190 | |
| DATED | : December 27, 2011 | |
| INVENTOR(S) | : Charles D. Bailey et al. | |

It is certified that error appears in the above-identified patent and that said Letters Patent is hereby corrected as shown below:

ON THE TITLE PAGE:

Item (73), in Assignee, in column 1, line 1 delete "Automobile" and insert -- Automotive --, therefor.

IN THE CLAIMS:

In column 8, line 31, in Claim 25, delete "8.5+-3.0" and insert -- 8.5+/-3.0 --, therefor.

Signed and Sealed this
Fifth Day of June, 2012

David J. Kappos
*Director of the United States Patent and Trademark Office*